(12) United States Patent
Kang

(10) Patent No.: US 10,369,637 B2
(45) Date of Patent: Aug. 6, 2019

(54) FIVE-AXIS PROCESSING MACHINE

(71) Applicant: DOOSAN MACHINE TOOLS CO., LTD., Changwon-si, Gyeongsangnam-do (KR)

(72) Inventor: Hyo Seog Kang, Changwon-si (KR)

(73) Assignee: DOOSAN MACHINE TOOLS CO., LTD., Changwon-si, Gyeongsangnam-Do (KR)

( * ) Notice: Subject to any disclaimer, the term of this patent is extended or adjusted under 35 U.S.C. 154(b) by 0 days.

(21) Appl. No.: 15/549,871

(22) PCT Filed: Feb. 5, 2016

(86) PCT No.: PCT/KR2016/001273
§ 371 (c)(1),
(2) Date: Aug. 9, 2017

(87) PCT Pub. No.: WO2016/129879
PCT Pub. Date: Aug. 18, 2016

(65) Prior Publication Data
US 2018/0015551 A1    Jan. 18, 2018

(30) Foreign Application Priority Data

Feb. 9, 2015    (KR) .......................... 10-2015-0019274

(51) Int. Cl.
*B23C 1/12*    (2006.01)
*B23Q 1/25*    (2006.01)
(Continued)

(52) U.S. Cl.
CPC .................. *B23C 1/12* (2013.01); *B23Q 1/25* (2013.01); *B23Q 1/623* (2013.01); *B23Q 5/02* (2013.01); *B23C 1/06* (2013.01); *B23Q 2220/006* (2013.01)

(58) Field of Classification Search
CPC .... B23C 1/06; B23C 1/12; B23Q 1/25; B23Q 5/02
(Continued)

(56) References Cited

U.S. PATENT DOCUMENTS 4,118,844 A * 10/1978 Matsuzaki ............ B23B 31/263
29/26 A
5,980,172 A * 11/1999 Shoda .................... B23B 31/263
144/1.1
(Continued)

FOREIGN PATENT DOCUMENTS

CN    101234474 A    8/2008
CN    201960174 U    9/2011
(Continued)

OTHER PUBLICATIONS

International Search Report for PCT/KR2016/001273 dated Apr. 19, 2016, citing the above reference(s).
(Continued)

*Primary Examiner* — Nicole N Ramos
(74) *Attorney, Agent, or Firm* — Hauptman Ham, LLP

(57) ABSTRACT

The present invention relates to a five-axis machining apparatus. A five-axis machining apparatus according an embodiment of the present invention includes: a column; a slide coupled to the column so as to be slidable in a vertical direction; a main spindle drive unit supported on the back of the slide; and a tiltable spindle module detachably coupled to the front of the slide, and configured to receive rotation power from the main spindle drive unit.

11 Claims, 10 Drawing Sheets

(51) Int. Cl.
*B23Q 5/02* (2006.01)
*B23Q 1/62* (2006.01)
*B23C 1/06* (2006.01)

(58) Field of Classification Search
USPC ....... 409/230, 144, 201, 211, 216, 215, 199, 409/231
See application file for complete search history.

(56) References Cited

U.S. PATENT DOCUMENTS

| | | | | |
|---|---|---|---|---|
| 7,159,294 | B2* | 1/2007 | Yamazaki | B23K 26/0884 219/121.6 |
| 7,172,375 | B2* | 2/2007 | Tanoue | B23Q 1/012 409/202 |
| 8,007,213 | B2* | 8/2011 | Yoshikawa | B23Q 5/045 409/215 |
| 8,197,164 | B2* | 6/2012 | Tatsuda | B23Q 1/5406 409/201 |
| 2005/0217095 | A1* | 10/2005 | Gstir | B23Q 1/012 29/27 C |
| 2006/0018725 | A1* | 1/2006 | Ichino | B23Q 11/0035 409/131 |
| 2008/0178447 | A1 | 7/2008 | Okada et al. | |

FOREIGN PATENT DOCUMENTS

| | | |
|---|---|---|
| CN | 102328097 A | 1/2012 |
| CN | 104653726 B | 5/2015 |
| GB | 1124312 A | 8/1968 |
| JP | 2004066430 A | 3/2004 |
| JP | 2008272889 A | 11/2008 |
| KR | 10-2013-0070003 A | 6/2013 |
| KR | 10-2014-0046699 A | 4/2014 |

OTHER PUBLICATIONS

Chinese Office Action dated Jul. 2, 2018 in connection with the counterpart Chinese Patent Application No. 201680008672.4, citing the above reference(s).

Extended European Search Report dated Jan. 30, 2019 in connection with the counterpart European Patent Application No. EP16749419.4.

The Chinese Office Action dated Mar. 19, 2019 in connection with the counterpart Chinese Patent Application No. 201680008672.4, citing the above reference(s).

* cited by examiner

FIVE-AXIS PROCESSING MACHINE

CROSS REFERENCE TO RELATED APPLICATION

This present application is a national stage filing under 35 U.S.C § 371 of PCT application number PCT/KR2016/001273 filed on Feb. 5, 2016 which is based upon and claims the benefit of priority to Korean Patent Application No. 10-2015-0019274 filed on Feb. 9, 2015 in the Korean Intellectual Property Office. The disclosures of the above-listed applications are hereby incorporated by reference herein in their entirety.

TECHNICAL FIELD

The present invention relates to a five-axis machining apparatus, and more specifically to a five-axis machining apparatus having a tiltable spindle module.

BACKGROUND ART

In general, machine tools refer to machines used for the purpose of machining metallic or non-metallic workpieces into desired shapes and desired dimensions by means of various types of tools by using various cutting or non-cutting methods.

Machine tools are basically classified into turning centers and machining centers according to their machining method. In this case, turning centers machine workpieces by rotating the workpieces, and machining centers machine workpieces by rotating tools.

Such a machining center is a composite machine tool into which a boring machine, a milling machine, and a drilling machine are integrated in a composite manner and which can perform all types of machining, such as cutting, drilling, tapping, etc. This machining center can perform three-axis machining by rectilinearly transferring a spindle configured to rotate a tool in three-axis directions.

Recently, with the development of the automobile, shipbuilding and aircraft industries, parts having complex shapes have increased in number. To improve the productivity of the machining of such parts, five-axis machining apparatuses capable of five-axis machining are widely used instead of a method of performing partial machining by means of a plurality of machining centers which perform three-axis machining. In this case, two-axis machining added to conventional three-axis machining may include rotating-axis machining adapted to rotate a table supporting a workpiece and tilting-axis machining adapted to tilt a spindle.

In this case, the plane of tilting movement in which the spindle is tilted needs to form a right angle with the plane of movement formed by rectilinear axes parallel to the table supporting a workpiece, i.e., a transverse rectilinear axis and a lateral rectilinear axis.

Meanwhile, in a structure in which a tilting head configured to tiltably support a spindle is connected to the transfer shaft of a transfer unit configured to transfer the spindle in a vertical direction in an integrated manner and reciprocates rectilinearly in a vertical direction, the inconvenience of also adjusting the transfer shaft in the vertical direction occurs during the process of adjusting a location so that the plane of the tilting movement of the spindle forms a right angle with the plane of the movement formed by the above-described transverse rectilinear axis and lateral rectilinear axis.

In other words, to adjust the plane of the tilting movement of the spindle, the fastening states of a ball screw and a nut used as the transfer shaft in the vertical direction need to be adjusted separately or the ball screw needs to be re-installed, it is necessary to check whether the plane of the tilting movement forms a right angle while moving the transfer shaft in the vertical direction, and it is necessary to repeatedly adjust the plane of the tilting movement of the spindle, the ball screw, and the nut when a right angle is not formed.

As described above, the conventional five-axis machining apparatus has a problem in that lots of time and effort are required to adjust the plane of the tilting movement of a spindle.

Furthermore, a five-axis machining apparatus needs to perform various types of cutting, including heavy cutting and high-speed cutting, on workpieces in order to machine complex shapes and various materials.

However, as the size of a spindle increases, it becomes more difficult to stably tilt the spindle, and thus there is a limitation on the size of the tiltable spindle.

Furthermore, due to the limitation on the size, when a built-in motor type spindle in which a drive motor is provided inside a spindle is used, it is difficult to implement the high-speed, low-torque and low-speed, high-torque rotation power which is required for a five-axis machining apparatus.

Therefore, it is necessary to provide a drive motor outside a spindle and rotate the spindle, in which case a problem arises in that it is not easy to supply rotation power to the tiltable spindle from the outside.

DISCLOSURE

Technical Problem

An embodiment of the present invention provides a five-axis machining apparatus which can facilitate location adjustment and maintenance and repair by means of a modularized tiltable spindle module.

Furthermore, an embodiment of the present invention provides a five-axis machining apparatus which can effectively supply rotation power to a tiltable spindle.

Technical Solution

According an embodiment of the present invention, there is provided a five-axis machining apparatus, including: a column; a slide coupled to the column so as to be slidable in a vertical direction; a main spindle drive unit supported on the back of the slide; and a tiltable spindle module detachably coupled to the front of the slide, and configured to receive rotation power from the main spindle drive unit.

The spindle module may include a spindle configured to rotate a tool for machining a workpiece, a spindle head configured to rotatably support the spindle, a tilting head configured to have a tilting drive unit configured to transfer rotation power to the spindle and a power transfer unit configured to tilt the spindle head, and a tilting body configured to support the tilting head, and detachably coupled to the slide; and the spindle, the spindle head, the tilting head, and the tilting body may be integrated into a module.

The spindle module may further include adjustment blocks provided at both side edges of the tilting body opposite with respect to the spindle and configured to adjust the height location of the tilting body coupled to the slide.

The five-axis machining apparatus may further include: a bed configured to support the column so as to be slidable in a lateral direction; and a saddle coupled to the bed so as to be slidable in a transverse direction. The height location of the tilting body may be adjusted via the adjustment blocks such that the plane of the lateral movement of the column and the transverse movement of the saddle forms a right angle with the plane of the tilting movement of the spindle.

In the five-axis machining apparatus, the main spindle drive unit may include a main spindle drive shaft, the power transfer unit of the tilting head may include a power transfer shaft, and the main spindle drive shaft and the power transfer shaft may be connected via couplings and may transfer power.

According another embodiment of the present invention, there is provided a five-axis machining apparatus, including: a spindle configured to rotate a tool for machining a workpiece; a spindle head configured to rotatably support the spindle; a tilting head configured to have a power transfer unit configured to transfer rotation power to the spindle via one side surface of the spindle head by using one or more bevel gears, and a tilting drive unit coupled to the other side surface of the spindle head and configured to tilt the spindle head, and further configured to tiltably support both side surfaces of the spindle head; and a main spindle drive motor connected to the power transfer unit of the tilting head, and configured to supply rotation power.

The spindle may include a spindle shaft, and a main spindle bevel gear formed on the outer circumferential surface of the spindle shaft.

The power transfer unit may include: a first power transfer shaft configured such that a first transfer bevel gear configured to engage with the main spindle bevel gear is formed on one side thereof; a second power transfer shaft configured such that a second transfer bevel gear is formed on one side thereof, and spaced apart from the first power transfer shaft in parallel to the first power transfer shaft; and a drive shaft connected in series to the main spindle drive motor, and configured such that a drive bevel gear configured to engage with the second transfer bevel gear is formed on one side thereof.

The power transfer unit may further include a mechanism configured to transfer power between the first power transfer shaft and the second power transfer shaft.

The mechanism configured to transfer power between the first power transfer shaft and the second power transfer shaft may be one or more helical gears.

In the five-axis machining apparatus, the main spindle bevel gear of the spindle may be rotated around the shaft of the first transfer bevel gear of the power transfer unit and may tilt the spindle head.

Furthermore, when the tilting drive unit tilts the spindle head, the shaft of the main spindle drive motor may be fastened.

The five-axis machining apparatus may further include a transmission connected between the motor shaft of the main spindle drive motor and the drive shaft of the power transfer unit and configured to include a planetary gear.

The transmission may operate in any one of: a high-speed mode in which the motor shaft of the main spindle drive motor and the drive shaft are connected in series to each other; and a low-speed mode in which the rotation power of the motor shaft of the main spindle drive motor is transferred to the drive shaft via the planetary gear.

The spindle, the spindle head, and the tilting head may be integrated into a module. The power transfer unit may be separably coupled to the motor shaft of the main spindle drive motor through the connection of couplings.

Advantageous Effects

According to an embodiment of the present invention, the five-axis machining apparatus can easily perform location adjustment and effectively perform maintenance and repair by means of the modularized tiltable spindle module.

According to an embodiment of the present invention, the five-axis machining apparatus can effectively supply rotation power to the tiltable spindle.

MODE FOR INVENTION

Figure 1:
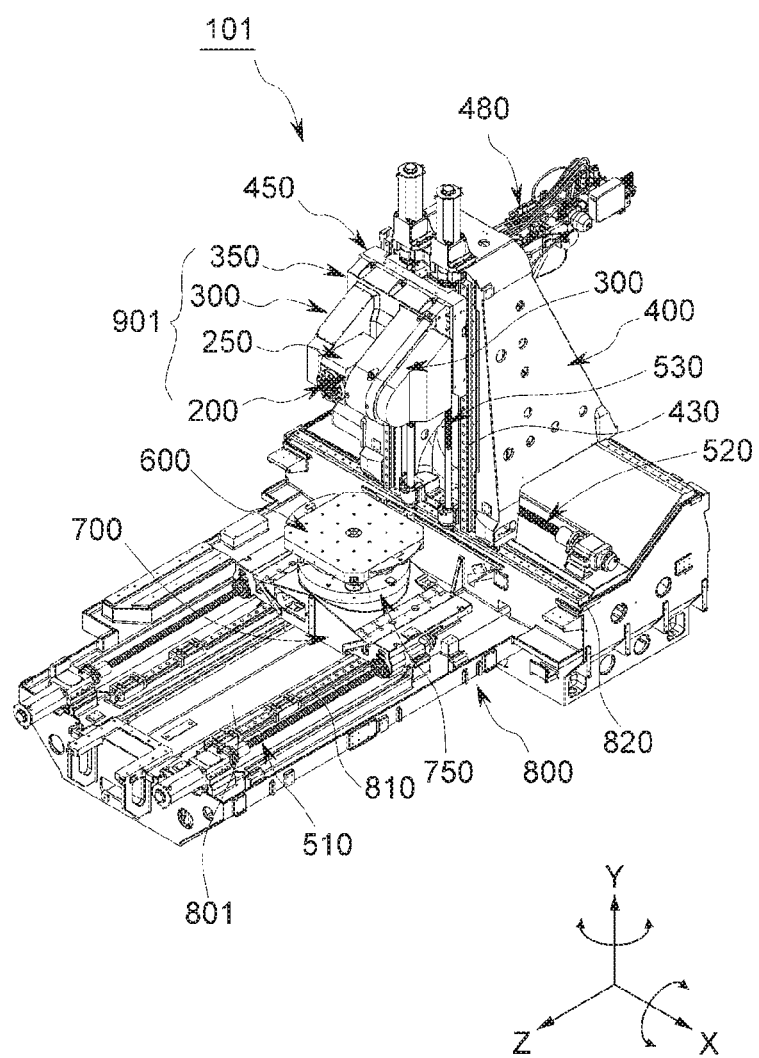
FIG. 1 is a perspective view of a five-axis machining apparatus according to a first embodiment of the present invention.

Embodiments of the present invention will be described in detail below with reference to the accompanying drawings so that those having ordinary knowledge in the art to which the present invention pertains can easily practice the present invention. The present invention may be implemented in various different forms, and is not limited to the embodiments described herein.

It is noted that the drawings are schematic, and are not necessarily drawn to scale. The relative dimensions and ratios of the components in the drawings may be exaggerated or diminished in size for the sake of clarity and convenience, and such arbitrary dimensions are merely illustrative and are not limitative. Furthermore, the same reference symbol is used for the same structure, element or part shown in two or more drawings in order to represent similar features.

The embodiments of the present invention specifically illustrate ideal embodiments of the present invention. As a result, various modifications of illustrations are expected. Accordingly, the embodiments are not limited to the specific forms of illustrated regions, and include, for example, the modifications of shapes resulting from manufacture.

A five-axis machining apparatus 101 according to a first embodiment of the present invention is described with reference to FIGS. 1 to 5 below.

As shown in FIGS. 1 to 5, the five-axis machining apparatus 101 according to the first embodiment of the present invention includes a column 400, a slide 450, a main spindle drive unit 480, and a spindle module 901.

Furthermore, the five-axis machining apparatus 101 according to the first embodiment of the present invention may further include a bed 800, a saddle 700, a table 600, a vertical transfer unit 530, a lateral transfer unit 520, a transverse transfer unit 510, and a table rotation drive unit 750.

The main spindle drive unit 480 is mechanically coupled to the spindle 200 of the spindle module 901 to be described later, and supplies rotation power to the spindle 200. The main spindle drive unit 480 may include various types of motors well known to those skilled in the art.

Furthermore, in the first embodiment of the present invention, the main spindle drive unit 480 is supported on the back of the slide 450 to be described later.

The spindle module 901 may include a spindle 200, a spindle head 250, a tilting head 300, and a tilting body 350. In other words, in the first embodiment of the present invention, the spindle module 901 is formed in an integrated manner so that the spindle 200, the spindle head 250, the tilting head 300, and the tilting body 350 are modularized, and can tilt the spindle 200.

Furthermore, the spindle module 901 is detachably attached to the front of the slide 450 to be described later, is coupled to main spindle drive unit 9480 to be described later, and receives rotation power.

Figure 3:
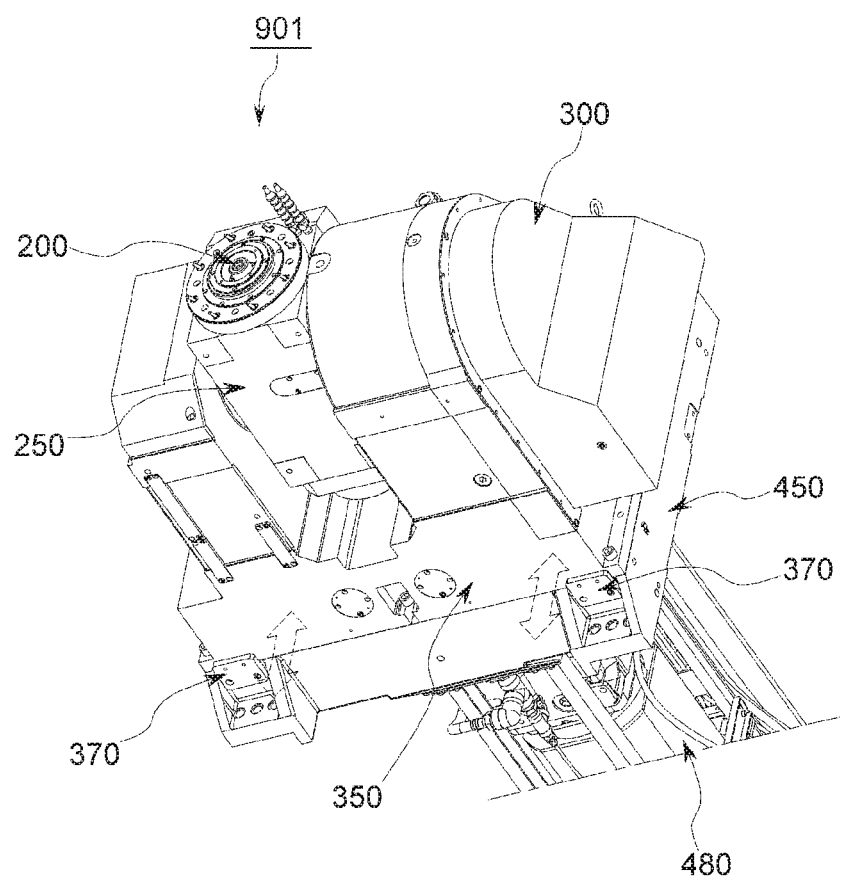
FIG. 3 is a perspective view showing a state in which the spindle module and slide of FIG. 1 are coupled to each other.

Furthermore, in the first embodiment of the present invention, the spindle module 901 may further include adjustment blocks 370 (shown in FIG. 3).

The spindle 200 comes into contact with a workpiece, and transfers rotation power to a tool for machining a workpiece. In other words, the spindle 200 clamps the tool for machining a workpiece at one end thereof, and rotates the tool. A clamping unit (not shown) configured to clamp the tool may be provided inside the spindle 200. In this case, various types of clamping units well known to those skilled in the art may be used as the clamping unit. Generally, a clamping unit including a collet may be used as the clamping unit.

Furthermore, in the first embodiment of the present invention, the spindle 200 may include: a spindle shaft 210; and a main spindle bevel gear 230 formed on the outer circumferential surface of the spindle shaft 210 so as to surround the spindle shaft 210.

The spindle head 250 surrounds the spindle 200, and rotatably supports the spindle 200. A bearing may be installed between the spindle head 250 and the spindle 200 so that the spindle head 250 can rotatably support the spindle 200.

The tilting head 300 tiltably supports the spindle head 250, and transfers the rotation power, supplied by the main spindle drive unit 480, to the spindle 200.

More specifically, the tilting head 300 includes: a power transfer unit 310 configured to transfer rotation power to the spindle 200; and a tilting drive unit 360 configured to tilt the spindle head 200.

In the first embodiment of the present invention, the power transfer unit 310 transfers the rotation power, supplied by the main spindle drive unit 480, to the spindle 200. More specifically, the power transfer unit 310 may include: a power transfer shaft 331; and a plurality of power transfer gears 335 including a power transfer bevel gear 334 configured to engage with the main spindle bevel gear 230 of the spindle 200 formed at one end of the power transfer shaft 331.

In the first embodiment of the present invention, the tilting drive unit 360 tilts the spindle head 250 configured to rotatably support the spindle 200. More specifically, the tilting drive unit 360 includes: a tilting drive shaft 381 coupled to the spindle head 250 and configured to tilt the spindle head 250; and a tilting drive motor 388 configured to supply rotation power to the tilting drive shaft 381.

Furthermore, the tilting drive unit 360 may further include one or more tilting drive gears 385 configured to mechanically couple the tilting drive motor 388 and the tilting drive shaft 381.

The tilting body 350 supports the tilting head 300, and detachably couples the slide 450 to be described later.

The adjustment blocks 370 are provided at both side edges of the tilting body 350 opposite with respect to the spindle 200, and may adjust the height location of the tilting body 350 coupled to the slide 450 to be described later.

Furthermore, when the tilting body 350 is coupled to the slide 450 to be described later, the power transfer shaft of the power transfer unit 310 of the tilting head 300 is connected to the main spindle drive shaft of the main spindle drive unit 480 via couplings 337 and 487, and can transfer power.

In contrast, when the tilting body 350 is separated from the slide 450 to be described later, the power transfer shaft of the power transfer unit 310 of the tilting head 300 is also separated from the main spindle drive shaft of the main spindle drive unit 480.

The bed 800 slidably supports the saddle 700 and column 400 to be described later.

More specifically, the bed 800 may include: a main frame 801; and linear guides 810 and 820 formed on the main frame 801 and slidably coupled to the saddle 700 and the column 400. In this case, the linear guide may include a transverse linear guide 810 and a lateral linear guide 820.

The saddle 700 is slidably coupled to the bed 800, and may reciprocate rectilinearly along the transverse linear guide 810 of the bed 800. In other words, the saddle 700 may reciprocate rectilinearly in a transverse direction (hereafter referred to as the "Z-axis direction").

The transverse transfer unit (hereafter referred to as the "Z-axis transfer unit") 510 is installed between the bed 800 and the saddle 700, and rectilinearly reciprocates the saddle 700 on the bed 800.

The table 600 supports a workpiece which is to be machined by a tool which is rotated by the spindle 200. Furthermore, the table 600 is installed on the saddle 700, and reciprocates rectilinearly along the saddle 700.

Furthermore, the table rotation drive unit 750 is provided between the table 600 and the saddle 700, and rotates the table 600 on which the workpiece is seated. In this case, the axis of rotation of the table 600 is parallel to a direction perpendicular to the plane of the table 600.

The column 400 may be stood upright in one region behind the bed 800 so as to be located behind the table 600.

Furthermore, the column 400 is slidably coupled onto the bed 800, and may reciprocate rectilinearly along the lateral linear guide 820 of the bed 800. In other words, the column 400 may reciprocate rectilinearly in a lateral direction (hereinafter referred to as the "X-axis direction."

The lateral transfer unit (hereinafter referred to as the "X-axis transfer unit") 520 is installed between the bed 800 and the column 400, and rectilinearly reciprocates the column 400 on the bed 800.

Furthermore, the column 400 may include a vertical linear guide 430 formed on one side in the direction of the table 600.

The slide 450 is slidably coupled to one side of the column 400 in the direction of the table 600, and reciprocates rectilinearly along the vertical linear guide 430 of the column 400. In other words, the slide 450 reciprocates rectilinearly in a vertical direction (hereinafter referred to as the "Y-axis direction").

The vertical transfer unit (hereinafter referred to as the "Y-axis transfer unit") 530 is disposed between the column 400 and the slide 450, and rectilinearly reciprocates the slide 450 in the vertical direction.

Furthermore, the slide 450 according to the first embodiment of the present invention supports the main spindle drive unit 480 on the back thereof, and is detachably coupled to the above-described spindle module 901 on the front thereof.

In other words, the spindle module 901 and the main spindle drive unit 480 may reciprocate rectilinearly along with the slide 450 in the Y-axis direction.

As an example, the Z-axis transfer unit 510, the X-axis transfer unit 520, and the Y-axis transfer unit 530 may be ball screw transfer units.

As described above, the five-axis machining apparatus 101 according to the first embodiment of the present invention may perform rectilinear driving in the Z-axis direction, the X-axis direction, and the Y-axis direction via the Z-axis transfer unit 510, the X-axis transfer unit 520, and the Y-axis transfer unit 530.

Furthermore, the five-axis machining apparatus 101 may further perform driving around two axes of rotation, including the rotation of the table 600 and the tilting of the tilting head 300.

As a result, the five-axis machining apparatus 101 according to the first embodiment of the present invention may perform machining based on driving associated with a total of five axes.

Furthermore, according to the first embodiment of the present invention, the height location of the tilting body 350 may be adjusted via the adjustment blocks 370 so that the plane formed by the lateral movement of the column 400 and the transverse movement of the saddle 700 forms a right angle with the plane of the tilting movement of the spindle 200.

In this case, the height location of the tilting body 350 may be adjusted using a method of adjusting the location by pushing the adjustment blocks 370 upward or hitting the adjustment blocks and then strongly coupling the tilting body 350 and the slider 450 to each other so that they are firmly engaged with each other.

Figure 4:
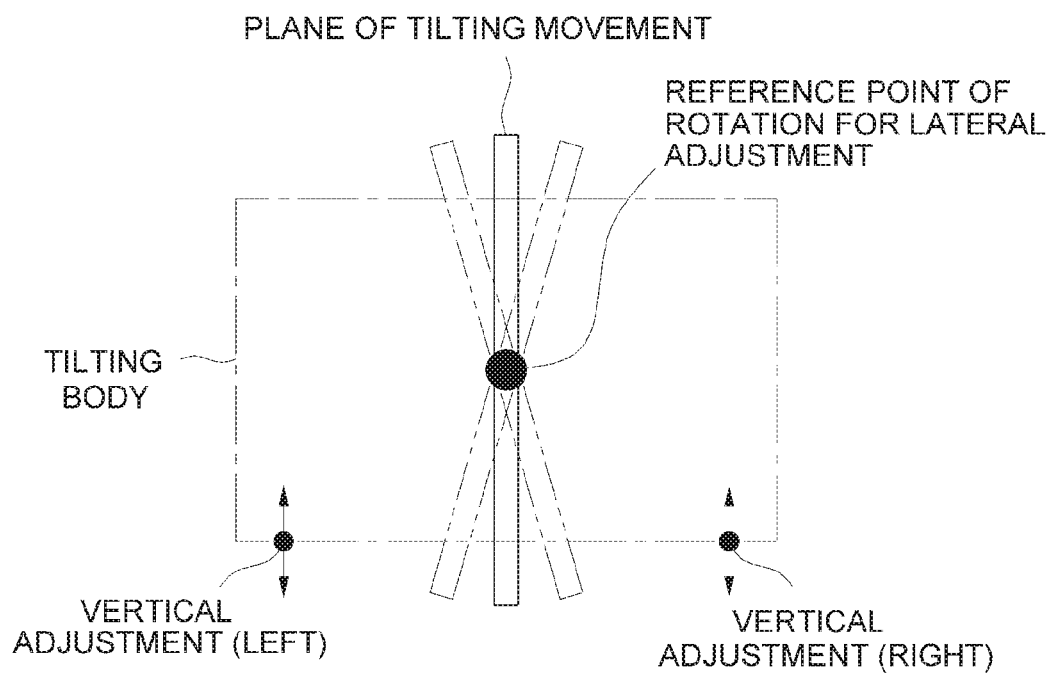
FIG. 4 is a conceptual diagram showing a method of adjusting the plane of the tilting movement of the spindle of FIG. 1.
Figure 5:
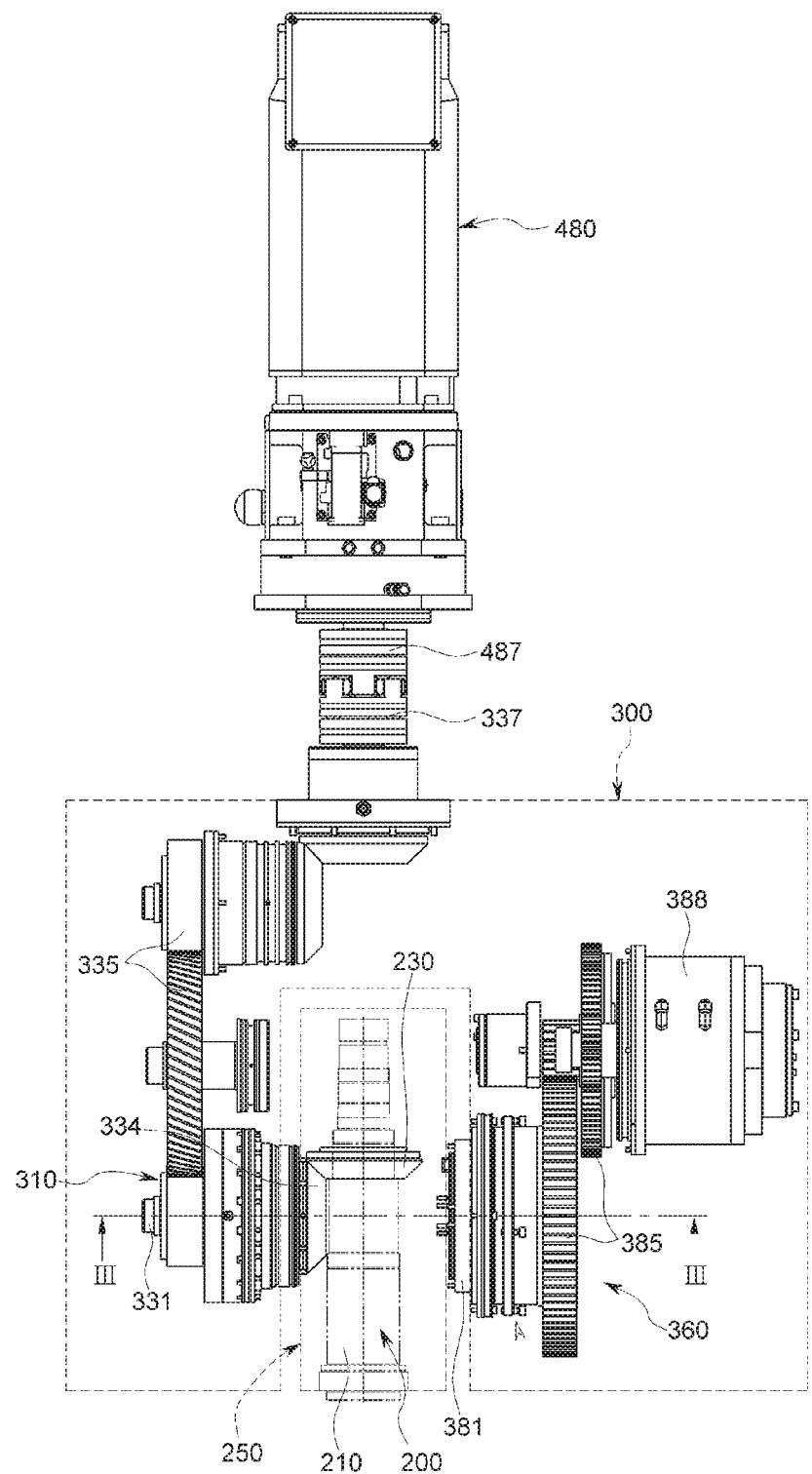
FIG. 5 is a plan view showing the internal structures of the spindle module and main spindle drive unit of FIG. 1.

In other words, as shown in FIG. 4, the height of the tilting body 350 integrated with the spindle 200, the spindle head 250 and the tilting head 300 into a module may be adjusted by adjusting the location of the adjustment block 370 so that the plane of the rectilinear movement performed by the Z-axis transfer unit 510 and the X-axis transfer unit 520 forms a right angle with the plane of the tilting movement.

Furthermore, according to the first embodiment of the present invention, there may be eliminated the inconvenience of also adjusting the Y-axis transfer unit 530 during the process of adjusting the location.

According to the above-described configuration, the five-axis machining apparatus 101 according to the first embodiment of the present invention may easily perform the operation of adjusting the location by means of the modularized tiltable spindle module 901.

Furthermore, according to the first embodiment of the present invention, axis adjustment for five axes can be easily performed. Furthermore, when a problem with the internal structure of the spindle 200 or tilting head 300 occurs and maintenance or repair is required, the spindle module 901 can be separated from the slide 450, and can be easily maintained or repaired.

A five-axis machining apparatus 102 according to a second embodiment of the present invention is described with reference to FIGS. 1, 2, and 6 to 10 below.

As shown in FIGS. 1, 2, 6, and 7, the five-axis machining apparatus 102 according to the second embodiment of the present invention includes a spindle 200, a spindle head 250, a tilting head 300, and a main spindle drive motor 480.

Furthermore, the five-axis machining apparatus 102 according to the second embodiment of the present invention may further include a transmission 470, a tilting body 350, a slide 450, a column 400, a bed 800, a saddle 700, a table 600, a vertical transfer unit 530, a lateral transfer unit 520, a transverse transfer unit 510, and a table rotation drive unit 750.

The spindle 200 comes into contact with a workpiece, and transfers rotation power to a tool for machining a workpiece. In other words, the spindle 200 clamps the tool for machining a workpiece at one end thereof, and rotates the tool. A clamping unit (not shown) configured to clamp the tool may be provided inside the spindle 200.

Furthermore, in the second embodiment of the present invention, the spindle 200 includes: a spindle shaft 210; and a main spindle bevel gear 230 formed on the outer circumferential surface of the main spindle body 210 so as to surround the main spindle body 210.

The spindle head 250 surrounds the spindle 200, and rotatably supports the spindle 200. A bearing may be installed between the spindle head 250 and the spindle 200 so that the spindle head 250 can rotatably support the spindle 200.

The main spindle drive motor 480 is mechanically connected to the spindle 200, and supplies rotation power to the spindle 200. Various types of motors well known to those skilled in the art may be used as the main spindle drive motor 480.

Furthermore, in the second embodiment of the present invention, the main spindle drive motor 480 is supported on the back of the slide 450 to be described later.

The tilting head 300 tiltably supports both sides of the spindle head 250. In the second embodiment of the present invention, the tilting head 300 tiltably supports the spindle head 250, and transfers the rotation power, supplied by the main spindle drive motor 480, to the spindle 200.

Figure 2:
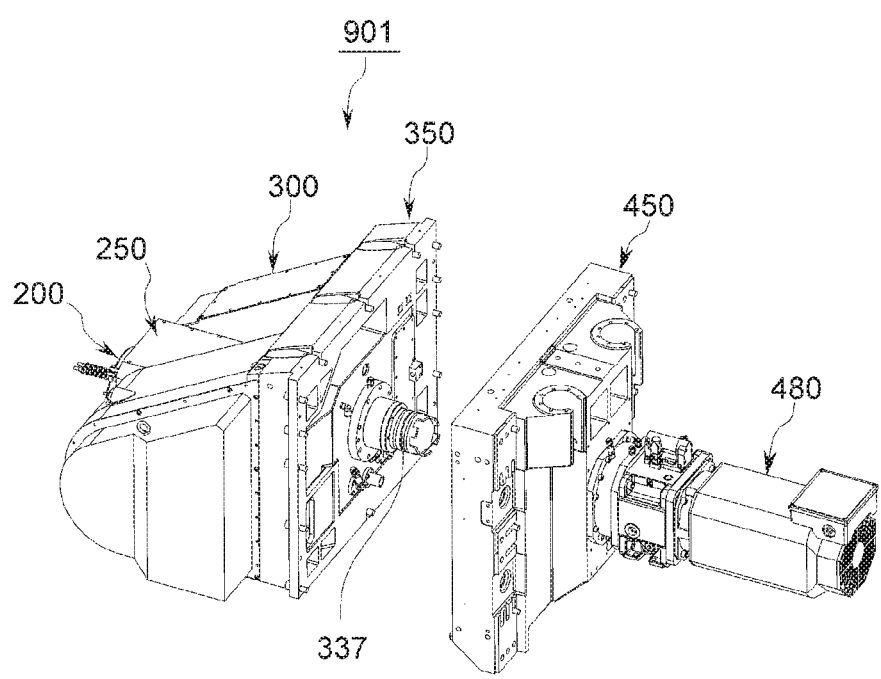
FIG. 2 is an exploded perspective view of the spindle module and slide of FIG. 1.

More specifically, as shown in FIG. 2, the tilting head 300 includes: a power transfer unit 310 configured to transfer rotation power to the spindle 200 via one side of the spindle head 250; and a tilting drive unit 360 coupled to the other side of the spindle head 250, and configured to tilt the spindle head 250.

In the second embodiment of the present invention, the power transfer unit 310 transfers the rotation power, supplied by the main spindle drive motor 480, to the spindle 200.

More specifically, the power transfer unit 310 includes a first power transfer shaft 321, a second power transfer shaft 333, and a drive shaft 341, and may further include one to three bevel gears.

A first transfer bevel gear 322 configured to engage with the main spindle bevel gear 230 is formed on one side of the first power transfer shaft 321, and a driven gear 323 is formed on the other side thereof.

The second power transfer shaft 333 is spaced to be parallel to the first power transfer shaft 321. Furthermore, a drive gear 332 configured to rotate the driven gear 323 of the first power transfer shaft 321 is formed on one side of the second power transfer shaft 333, and a second transfer bevel gear 338 is formed on the other side thereof.

The drive shaft 341 is connected in series to the main spindle drive motor 480, and a drive bevel gear 348 configured to engage with the second transfer bevel gear 338 of the second power transfer shaft 333 is formed on one side of the drive shaft 341.

Furthermore, the power transfer unit 310 may further include a mechanism configured to engage between the driven gear 323 of the first power transfer shaft 321 and the drive gear 332 of the second power transfer shaft 333 and to transfer power. In this case, the mechanism configured to transfer power may be at least one helical gear 357.

In the second embodiment of the present invention, the tilting drive unit 360 tilts the spindle head 250 which rotatably supports the spindle 200. More specifically, the tilting drive unit 360 includes: a tilting drive shaft 381 connected to the spindle head 250, and configured to tilt the spindle head 250; and a tilting drive motor 388 configured to supply rotation power to the tilting drive shaft 381.

Figure 8:
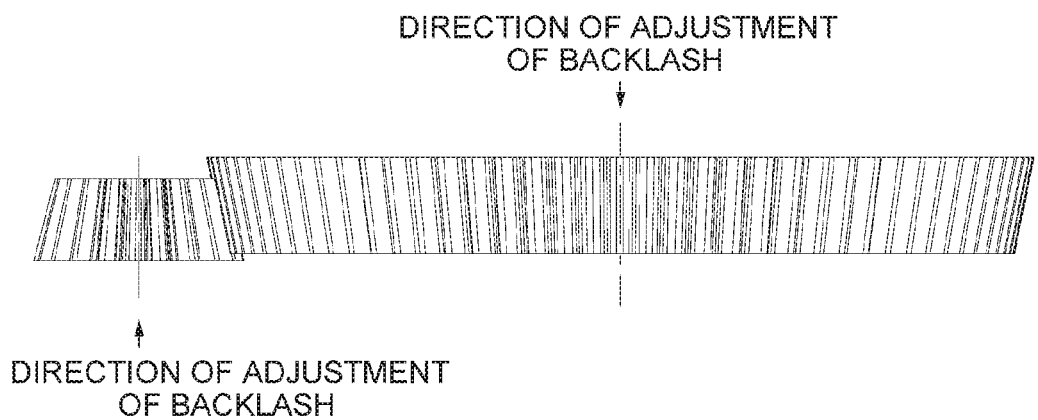
FIG. 8 is a plan view showing a method of adjusting the backlash between gears used in the tilting drive unit of the five-axis machining apparatus of FIG. 6.

Furthermore, the tilting drive unit 360 may further include one or more tilting drive gears 385 configured to mechanically connect the tilting drive motor 388 and the tilting drive shaft 381, and may easily adjust backlash by using the method shown in FIG. 8.

Furthermore, when the tilting drive unit 360 tilts the spindle head 250, the shaft of the main spindle drive motor 480 may be fastened.

The tilting body 357 supports the tilting head 300, and is detachably coupled to the slide 450 to be described later.

Figure 6:
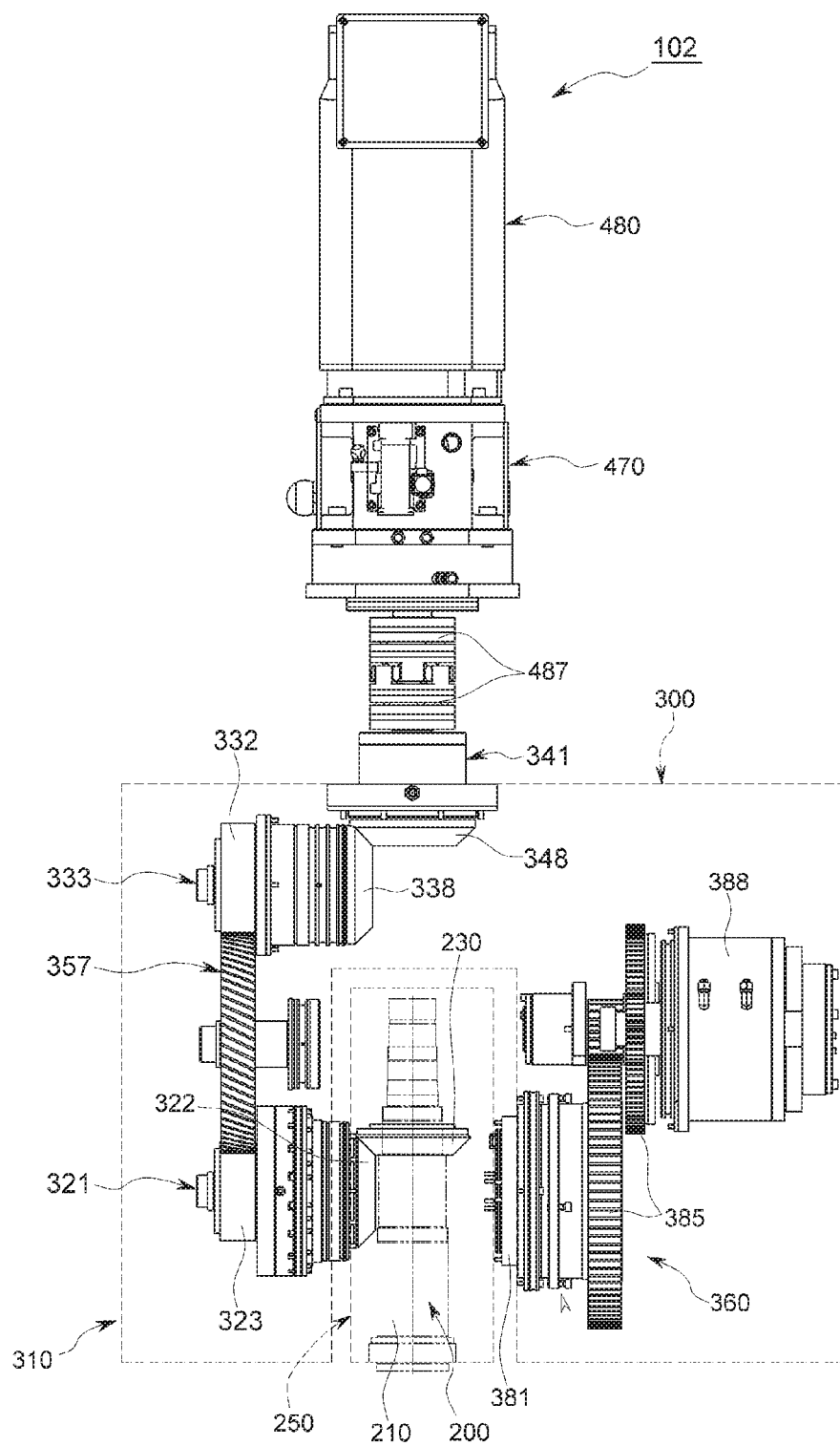
FIG. 6 is a plan view showing a state in which the spindle, tilting head and main spindle drive motor of a five-axis machining apparatus according to a second embodiment of the present invention are connected to one another.
Figure 7:
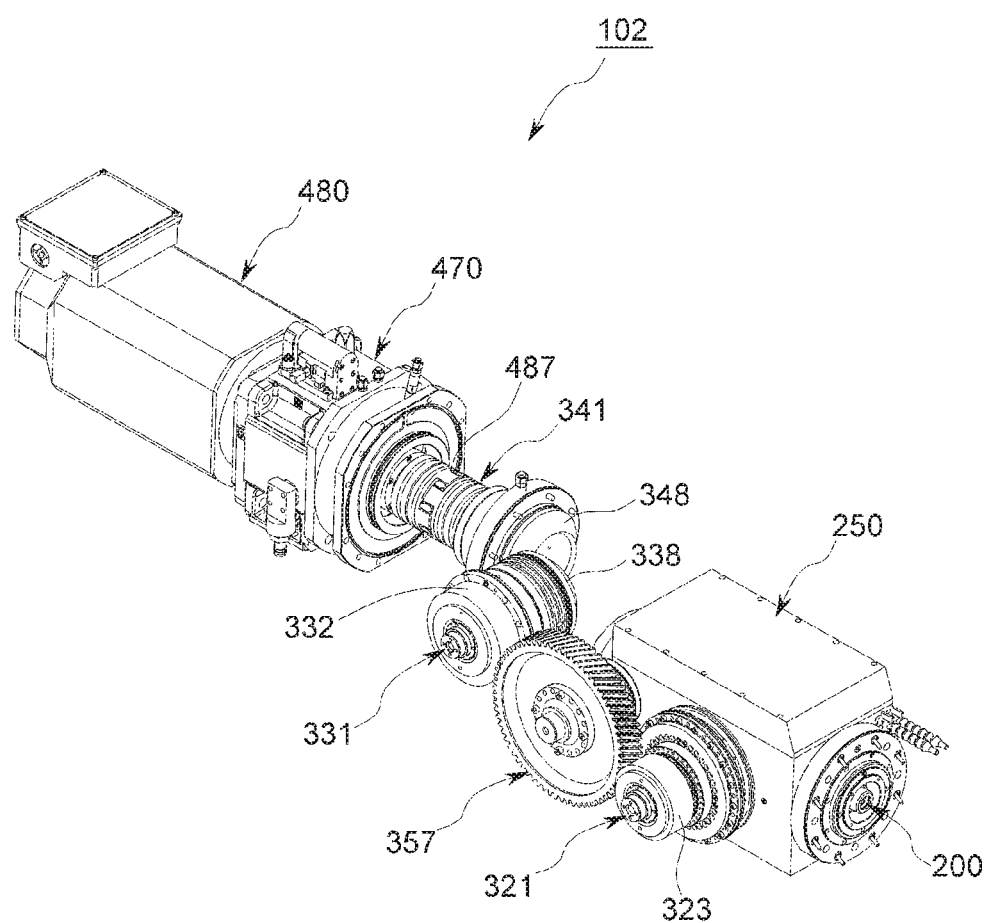
FIG. 7 is a perspective view showing configurations configured to transfer the power of the main spindle drive motor of FIG. 6 to the spindle.

Furthermore, in the second embodiment of the present invention, the spindle 200, the spindle head 250, the tilting head 300, and the tilting body 350 may be integrated into a module, as shown in FIGS. 2 and 6.

In this case, the drive shaft 341 of the power transfer unit 310 may be separably connected to the motor shaft of the main spindle drive motor 480 through the connection of the coupling 487.

In other words, when the tilting body 350 is separated from the slide 450, the spindle 200, the spindle head 250, and the tilting head 300 integrated with the tilting body 350 into a module are also separated from the slide 450, and thus the connection of the coupling 487 which connects the drive shaft 341 may be released.

The transmission 470 is connected between the motor shaft 481 of the main spindle drive motor 480 and the drive shaft 341. The transmission 470 includes a planetary gear 473 having gear reduction ratio.

In the second embodiment of the present invention, the transmission 470 may operate in any one of: high-speed mode in which the motor shaft 481 of the main spindle drive motor 480 and the drive shaft 341 are connected in series; and low-speed mode in which the rotation power of the motor shaft 481 of the main spindle drive motor 480 is transferred to the drive shaft 341 via the planetary gear 473.

This mode may be selected via a numerical control (NC) device (not shown). The NC device controls the operation of the five-axis machining apparatus 102 according to an input NC program.

Furthermore, the selection of the mode may be performed according to the cutting method of a tool for a workpiece. The cutting method includes heavy cutting, high-speed cutting, general cutting, etc.

More specifically, the transmission 470 includes the planetary gear 473, a sun gear 474, a ring gear 472, a carrier 471, a sliding sleeve 476, and a brake disk 478.

Figure 9:
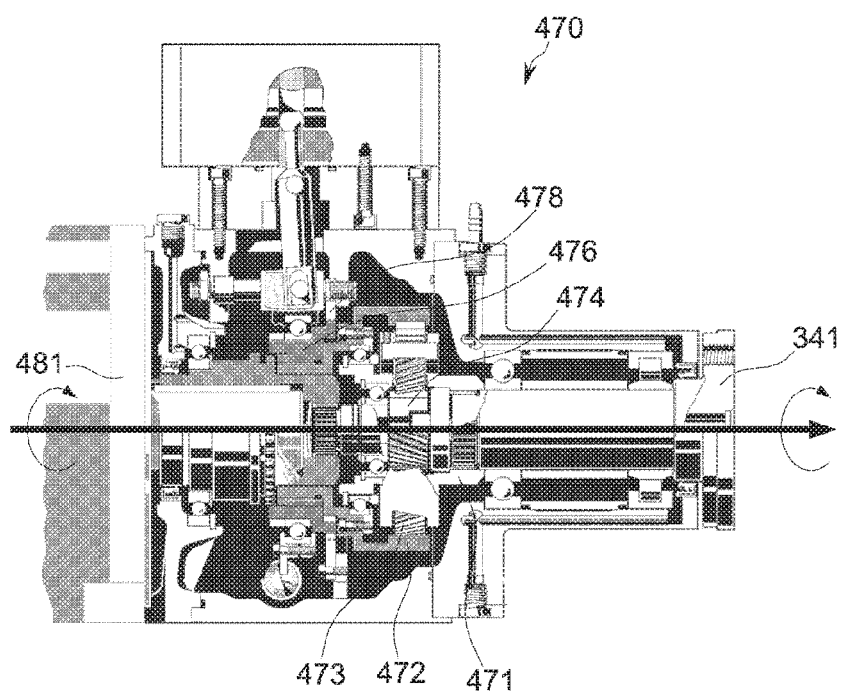
FIGS. 9 and 10 are sectional views showing operation states of a transmission used in the five-axis machining apparatus of FIG. 6.

As shown in FIG. 9, in the high-speed mode, for the transmission 470 to perform low-speed, low-torque driving, the input gear transfers power directly to an output stage without the intervention of the planetary gear 473, and thus rotation power having a speed identical to the rotation speed of the main spindle drive motor 480 is transferred to the output stage. In this case, the input gear becomes the ring gear 472, and the output stage becomes the carrier 471.

In other words, in the high-speed mode, the sun gear sun gear 474 is rotated in the state of being coupled to the ring gear ring gear 472 by the sliding sleeve 476, and thus the overall planetary gear 473 is rotated along with the motor shaft 481 of the main spindle drive motor 480.

Figure 10:
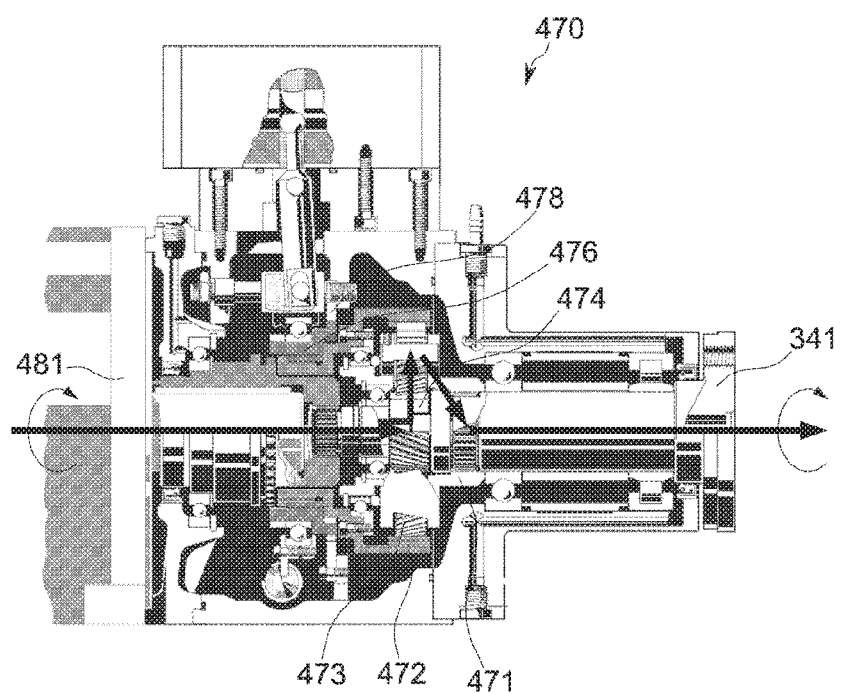

As shown in FIG. 10, in the low-speed mode, for the transmission 470 to perform low-speed, high-torque driving, the input gear reduces power at the gear reduction ratio of the planetary gear 473, and transfers the reduced power to the output stage. In this case, the input gear becomes the sun gear 474, and the output stage becomes the carrier 471.

In other words, the sliding sleeve 476 is fastened by the brake disk brake disk 478 in the state of being coupled to the ring gear ring gear 472.

Furthermore, the transmission 470, together with the main spindle drive motor 480, is supported on the back of the slide 450 to be described later.

As shown in FIG. 1, the bed 800 slidably supports the saddle 700 and the column 400 to be described later.

The structures and operation principles of the bed 800, the saddle 700, the Z-axis transfer unit 510, the table 600, the table rotation drive unit 750, the column 400, the X-axis transfer unit 520, the slide 450, and the Y-axis transfer unit 530 may be the same as those of the first embodiment.

However, in the second embodiment of the present invention, the spindle 200, the spindle head 250, and the tilting head 300 integrated with the tilting body 350 into a module are supported on the front of the slide 450, and the transmission 470 and the main spindle drive motor 480 are supported on the back of the slide 450. In this case, the tilting body 350 is separably coupled to the slide 450.

In other words, the spindle 200, the spindle head 250, tilting head 300, the tilting body 350, the transmission 470, and the main spindle drive motor 480 may reciprocate rectilinearly along with the slide 450 in the Y-axis direction.

As described above, the five-axis machining apparatus 102 according to the second embodiment of the present invention may perform rectilinear driving in the Z-axis direction, the X-axis direction, and the Y-axis direction via Z-axis transfer unit 510, X-axis transfer unit 520, and Y-axis transfer unit 530.

Furthermore, the five-axis machining apparatus 101 may further perform driving around two axes of rotation, including the rotation of the table 600 and the tilting of the tilting head 300.

As a result, the five-axis machining apparatus 101 according to the second embodiment of the present invention may perform machining based on driving associated with a total of five axes.

According to the above-described configuration, the five-axis machining apparatus 102 according to the second embodiment of the present invention may effectively transfer rotation power to the tiltable spindle 200.

In other words, the main spindle drive motor 480 is provided outside the spindle 200, and thus it may be possible to effectively supply rotation power to the tiltable spindle 200 from the outside while supplying rotation power having high torque or rotation speed to the spindle 200.

Furthermore, the configurations configured to tilt the spindle 200 and to transfer power are integrated into a module. When it is necessary to maintain or repair the configurations, the modularized configurations can be separated from the slide 450, and can be easily maintained or repaired.

While the embodiments of the present invention has been described with reference to the accompanying drawings, it will be appreciated by those skilled in the art to which the present invention pertains that the present invention may be practiced in other specific forms without a change to technical spirit or an essential.

Therefore, it should be understood that the above-described embodiments are illustrative but not limitative in all aspects, the scope of the present invention is defined by the following claims rather than the detailed description, and all modifications and variations derived from the meanings, ranges and equivalent concepts of the claims should be construed as falling within the scope of the present invention.

INDUSTRIAL APPLICABILITY

The five-axis machining apparatus according to an embodiment of the present invention can be used to easily perform location adjustment and effectively perform maintenance and repair by means of the modularized tiltable spindle module.

Furthermore, the five-axis machining apparatus according to an embodiment of the present invention can be used to effectively supply rotation power to the tiltable spindle.

The invention claimed is:

1. A five-axis machining apparatus, comprising:
a column;
a slide coupled to the column so as to be slidable in a vertical direction;
a main spindle drive unit supported on a back of the slide; and
a tiltable spindle module detachably coupled to a front of the slide, and configured to receive rotation power from the main spindle drive unit,
wherein the spindle module is modularized such that:
a spindle is configured to rotate a tool for machining a workpiece;
a spindle head is configured to rotatably support the spindle;
a tilting head is configured to have a tilting drive unit configured to transfer rotation power to the spindle and a power transfer unit configured to tilt the spindle head; and
a tilting body is configured to support the tilting head, and detachably coupled to the slide are integrated with each other,
wherein the tilting body has two sides located opposite to the spindle, and the spindle module further comprises adjustment blocks provided at both sides opposite of the tilting body with respect to the spindle and configured to adjust a height location of the tilting body coupled to the slide.

2. The five-axis machining apparatus of claim 1, further comprising:
a bed configured to support the column so as to be slidable in a lateral direction; and
a saddle coupled to the bed so as to be slidable in a transverse direction;
wherein the height location of the tilting body is adjusted via the adjustment blocks such that a plane of lateral movement of the column and transverse movement of the saddle forms a right angle with a plane of tilting movement of the spindle.

3. The five-axis machining apparatus of claim 1, wherein:
the main spindle drive unit comprises a main spindle drive shaft, and the power transfer unit of the tilting head comprises a power transfer shaft; and
the main spindle drive shaft and the power transfer shaft are connected via couplings, and transfer power.

4. A five-axis machining apparatus, comprising:
a spindle configured to rotate a tool for machining a workpiece;
a spindle head configured to rotatably support the spindle, wherein the spindle head has two sides located circumferentially opposite to each other;
a tilting head configured to have a power transfer unit configured to transfer rotation power to the spindle via one side surface of the spindle head by using one or more bevel gears, and a tilting drive unit coupled to the other side surface of the spindle head and configured to tilt the spindle head, and further configured to tiltably support both sides opposite of the spindle head; and
a main spindle drive motor connected to the power transfer unit of the tilting head, and configured to supply rotation power,
wherein the spindle comprises a spindle shaft, and a main spindle bevel gear formed on an outer circumferential surface of the spindle shaft,
wherein the power transfer unit comprises:
a first power transfer shaft configured such that a first transfer bevel gear configured to engage with the main spindle bevel gear is formed on one side thereof;
a second power transfer shaft configured such that a second transfer bevel gear is formed on one side thereof, and spaced apart from the first power transfer shaft in parallel to the first power transfer shaft; and
a drive shaft connected in series to the main spindle drive motor, and configured such that a drive bevel gear configured to engage with the second transfer bevel gear is formed on one side thereof.

5. The five-axis machining apparatus of claim 4, wherein the power transfer unit further comprises a mechanism configured to transfer power between the first power transfer shaft and the second power transfer shaft.

6. The five-axis machining apparatus of claim 5, wherein the mechanism configured to transfer power between the first power transfer shaft and the second power transfer shaft is one or more helical gears.

7. The five-axis machining apparatus of claim 4, wherein the main spindle bevel gear of the spindle is rotated around a shaft of the first transfer bevel gear of the power transfer unit, and tilts the spindle head.

8. The five-axis machining apparatus of claim 4, wherein when the tilting drive unit tilts the spindle head, a shaft of the main spindle drive motor is fastened.

9. The five-axis machining apparatus of claim 4, further comprising a transmission connected between a motor shaft of the main spindle drive motor and a drive shaft of the power transfer unit and configured to include a planetary gear.

10. The five-axis machining apparatus of claim 9, wherein the transmission operates in any one of:
   a high-speed mode in which the motor shaft of the main spindle drive motor and the drive shaft are connected in series to each other; and
   a low-speed mode in which rotation power of the motor shaft of the main spindle drive motor is transferred to the drive shaft via the planetary gear.

11. The five-axis machining apparatus of claim 4, wherein:
   the spindle, the spindle head, and the tilting head are integrated into a module, and
   the power transfer unit is separably coupled to a motor shaft of the main spindle drive motor through connection of couplings.

\* \* \* \* \*